(12) United States Patent
Berlin et al.

(10) Patent No.: US 7,302,832 B2
(45) Date of Patent: Dec. 4, 2007

(54) USE OF ARRAYS OF ATOMIC FORCE MICROSCOPE/SCANNING TUNNELING MICROSCOPE TIPS TO SCAN NANOCODES

(75) Inventors: Andrew Berlin, San Jose, CA (US); Narayanan Sundararajan, San Francisco, CA (US); Mineo Yamakawa, Campbell, CA (US); Valluri R. Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/748,526

(22) Filed: Dec. 29, 2003

(65) Prior Publication Data
US 2005/0138996 A1 Jun. 30, 2005

(51) Int. Cl.
*G01N 13/12* (2006.01)
*G01N 13/16* (2006.01)
(52) U.S. Cl. ........................................ 73/105
(58) Field of Classification Search ............ 73/105
See application file for complete search history.

(56) References Cited
U.S. PATENT DOCUMENTS
5,047,633 A * 9/1991 Finlan et al. .............. 250/306

6,514,767 B1 2/2003 Natan
2002/0172963 A1* 11/2002 Kelley et al. ................ 435/6
2003/0033863 A1* 2/2003 Ashby et al. ............... 73/105
2004/0058328 A1* 3/2004 Chan et al. .................. 435/6

OTHER PUBLICATIONS

Doering, et al., "Spectroscopic Tags Using Dye-Embedded Nanoparticles and Surface -Enhanced Raman Scattering", *Analytical Chemistry*, :5-9.
Mulvaney, et al., "Glass-Coated, Analyte-Tagged Nanoparticles: A New Tagging System Based on *Detection* with Surface-Enhanced Raman Scattering", *Am Chem Soc.* 19:4784-4790 (2003).

* cited by examiner

*Primary Examiner*—Daniel S. Larkin
(74) *Attorney, Agent, or Firm*—Darby & Darby, P.C.

(57) ABSTRACT

A surface analysis device is disclosed for identifying molecules by simultaneously scanning nanocodes on a surface of a substrate. The device includes a scanning array that is capable of simultaneously scanning the nanocodes on the surface of the substrate and an analyzer that is coupled with the scanning array. The analyzer is capable of receiving simultaneously scanned information from the scanning array and identifying molecules associated with the nanocodes.

26 Claims, 6 Drawing Sheets

USE OF ARRAYS OF ATOMIC FORCE MICROSCOPE/SCANNING TUNNELING MICROSCOPE TIPS TO SCAN NANOCODES

FIELD OF THE INVENTION

The present invention relates generally to the field of detection and identification of molecular species and more specifically to identifying and sequencing molecular species by scanning nanocodes.

BACKGROUND INFORMATION

The medical field, among others, is increasingly in need of techniques for accelerated identification and characterization of molecules. In particular, techniques for rapidly sequencing a DNA molecule have become more important due in part to recent medical advances utilizing genetics and gene therapy. For a variety of reasons, it has become advantageous to know the sequence of particular DNA molecules. Methods currently exist to identify and characterize molecules, such as DNA molecules, however existing methods are slow and cumbersome to meet the current characterization and sequencing demands.

What is needed is a device and method for characterizing molecules that reduces the possibility of characterization errors such as inconclusive readings and misidentified readings. What is also needed is a device and method for characterizing molecules that can be performed at faster speeds.

BRIEF DESCRIPTION OF THE DRAWINGS

In the following detailed description of the invention reference is made to the accompanying drawings which form a part hereof, and in which are shown, by way of illustration, specific embodiments in which the invention may be practiced. These embodiments are described in sufficient detail to enable those skilled in the art to practice the invention. Other embodiments may be utilized, and structural, logical, and electrical changes may be made, without departing from the scope of the present invention.

DETAILED DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

In the following descriptions, friction coefficients of materials are discussed. A friction coefficient, by definition, describes forces of interaction between at least two objects or surfaces. A friction coefficient can be described as including both an abrasive component, and an adhesive component. Abrasive friction is defined as primarily a mechanical interaction between two objects. In one example of abrasive friction, resistance to movement at an interface between two objects is generated by asperities on the surfaces of the objects rising past each other or breaking off. In contrast, adhesive friction is defined as primarily a chemical interaction between two objects. A friction coefficient may be determined either by abrasive factors, adhesive factors, or a combination of the two.

Figure 1:
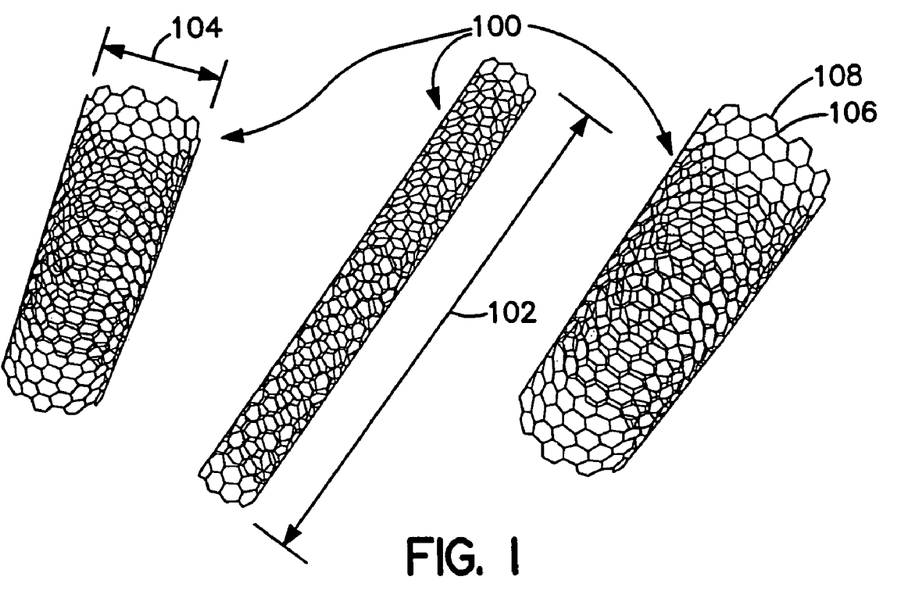
FIG. 1 shows a variety of tag elements.

FIG. 1 shows a number of tag elements 100. The tag elements may be organic, inorganic or biochemical elements that can be distinguished by an atomic force microscope (AFM) or a scanning tunneling microscope (STM). For example, the tag elements can be nano-scale fullerene structures, such as nanotubes, or spheres that are commonly referred to as buckyballs. FIG. 1 shows a number of carbon nanotube 100 tag elements. Carbon nanotubes are nanometer-sized tube like structures formed from carbon atoms. The nanotubes 100 shown have dimensional variations that distinguish the individual nanotubes 100 from each other. One dimensional variation includes length 102, and another dimensional variation includes diameter 104. Each carbon nanotube 100 includes a number of carbon atoms located at line intersections 106 as diagramed in FIG. 1. Bonds between individual carbon atoms are represented by the lines 108 that are interconnected to form the depicted structure of the carbon nanotubes 100. Further details of the basic structure of a carbon nanotube will be recognized by one skilled in the art. One skilled in the art will also recognize that other Scanning Probe Microscopy (SPM) methods may be used, such as Magnetic force microscopy (MFM) and scanning capacitance microscopy (SCM).

Figure 2:
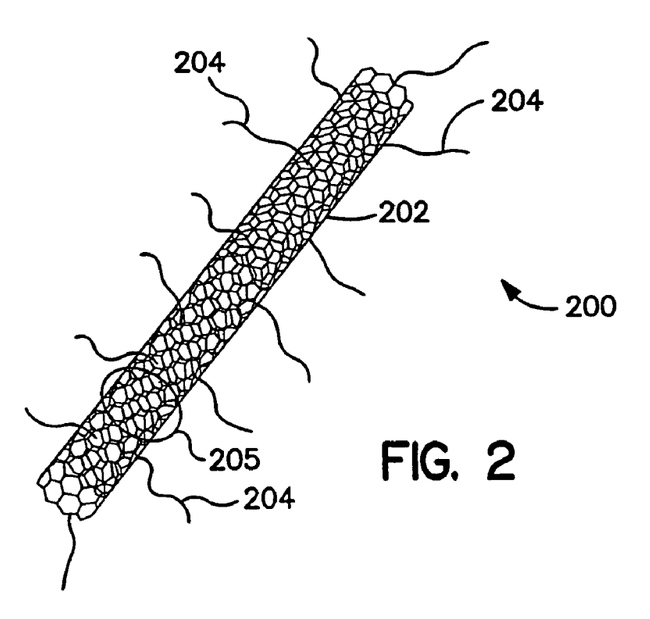
FIG. 2 shows a tag element that has been modified.

FIG. 2 shows a carbon nanotube assembly 200 that has been modified according to one embodiment of the invention. The nanotube assembly 200 includes a carbon nanotube 202, with a number of additional molecules 204 attached to the nanotube 202 at various locations. The additional molecules 204 are not drawn to scale in the Figure, and the illustration is intended as a diagram to illustrate the modification concept. One skilled in the art will recognize that the number and location of additional molecules 204 can be varied. In one embodiment, several additional molecules 204 are chemically attached to the surface of the carbon nanotube 202 in a homogenous distribution about the surface of the carbon nanotube 202. Although carbon nanotubes are shown in FIG. 2 as the tag elements, other organic, inorganic or biochemical structures can be used in alternative embodiments.

The attachment of additional molecules 204 to the surface of the carbon nanotube 202 serves to modify a coefficient of friction or electrical characteristic of the carbon nanotube 202. Although the embodiment shown in FIG. 2 shows modification of a surface of the carbon nanotube 202, other embodiments within the scope of the invention include modification of a second object forming the friction or electrical interface. In one embodiment, the second object includes a component of a surface analysis device, such as a tip from an atomic force microscope (AFM) or a scanning tunneling microscope (STM).

The newly formed nanotube assembly 200 will provide a coefficient of friction that is distinguishably different from an unmodified carbon nanotube 202. The coefficient of friction is modified by changing adhesive friction factors. In one embodiment, the coefficient of friction of the nanotube assembly 200 will be raised higher than the coefficient of friction of the carbon nanotube 202 alone. In another embodiment, the coefficient of friction of the nanotube assembly 200 will be modified lower than the coefficient of friction of the carbon nanotube 202 alone. One skilled in the art will recognize that although the embodiment in FIG. 2 shows additional molecules attached to the carbon nanotube 202 to modify a coefficient of friction, other methods of modifying the coefficient of friction are within the scope of the invention. Other methods may include, but are not limited to, modification of abrasive friction factors, such as physical surface modification of the carbon nanotube 202, without the attachment of additional molecules 204.

In one embodiment, the additional molecules 204 attached to the carbon nanotube 202 include carboxylic acid moieties. One method used to attach carboxylic acid moieties to the carbon nanotube 202 includes an acid treatment. The carbon nanotubes 202 are immersed in an acid solution. In one embodiment, the acid immersion takes place at approximately room temperature. Although various acid solutions may be used, the acid solution may include concentrated sulfuric acid and concentrated nitric acid. The nanotubes 202 are later placed in a device, such as an ultrasonicator, for a period of time to ensure proper mixing and acid reaction on all surfaces of the nanotubes 202. Any excess acid is then removed, and the nanotubes are then rinsed in a solution such as ethanol or acetone to rinse away unwanted acid solution. A de-ionized water rinse is performed to further rinse the nanotubes 202. The preceding acid treatment is one example of attaching additional molecules 204 to the surface of nanotubes 202 for modification of the adhesive coefficient of friction. Other methods of molecular attachment or friction modification may also be used within the scope of the invention. In another embodiment, the molecules 205 may be wrapped around the nanotubes 202, esp. DNA molecules, or a combination of attaching and wrapping the molecules around the nanotubes 202.

Figure 3:
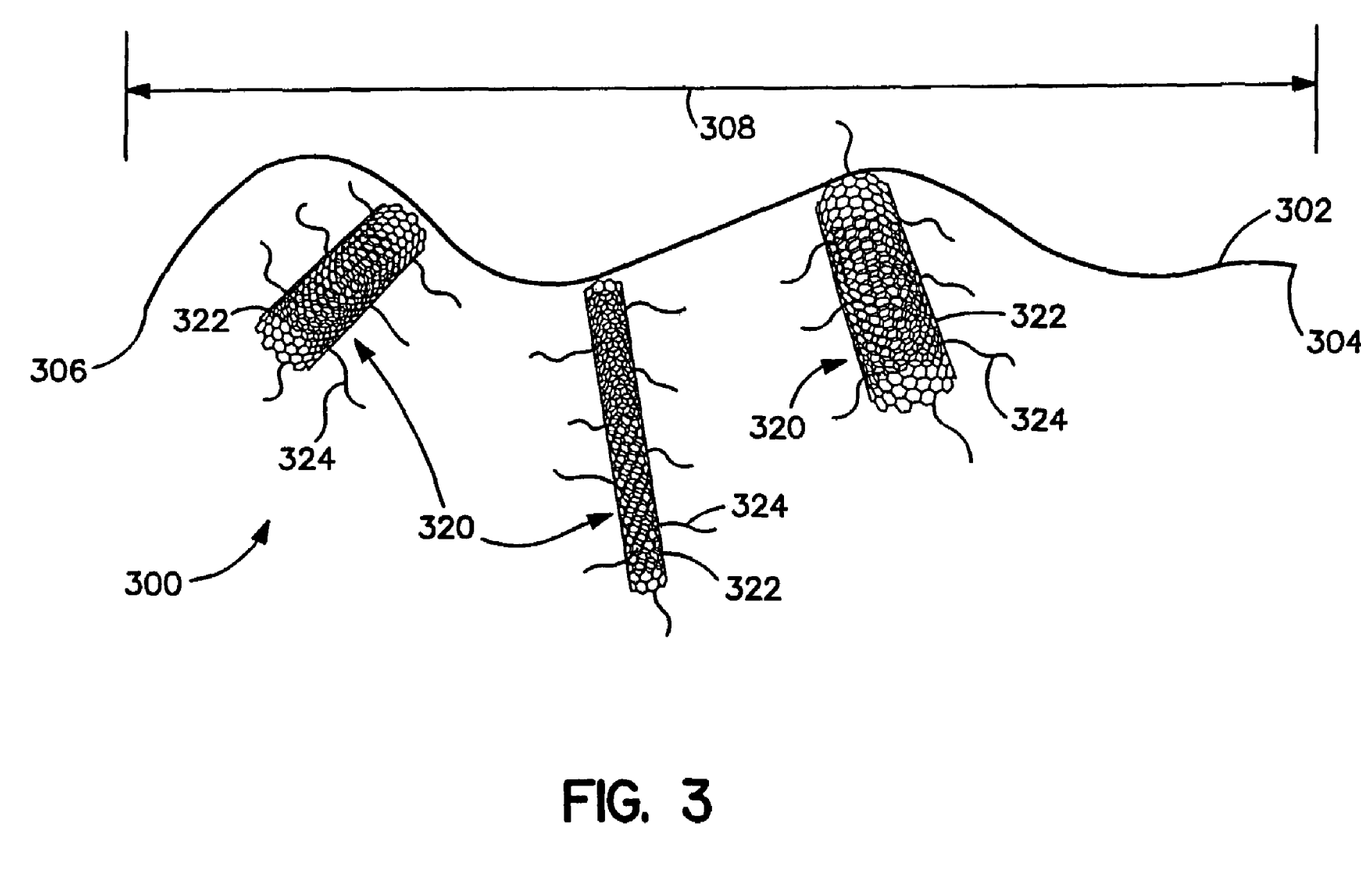
FIG. 3 shows a nanocode.

FIG. 3 shows a nanocode or molecular identification assembly 300. The nanocode 300 includes a reactive molecule 302. In one embodiment, the reactive molecule 302 may include an assay molecule adapted for hybridization reactions with a chain sample molecule, such as a DNA molecule. Any number of possible reactive molecules 302 may be used with the invention. When used for sequencing DNA sample molecules, several thousands of variations of reactive molecules may be used. In another embodiment, the variations of reactive molecules include chain molecules, for example, each may be approximately 18 monomers in length. Short reactive molecules provide a more detailed characterization of sample molecules being tested.

The reactive molecule 302 has a first end 304, a second end 306 and a length 308. One or more nanotube assemblies 320 may be attached along the length 308 of the reactive molecule 302. The nanotube assemblies 320 each include a carbon nanotube 322 and a number of additional molecules 324 attached to the surface of the nanotubes 322. The nanotube assemblies 320 are similar to the nanotube assemblies 200 described in FIG. 2.

Several combinations of nanotube assemblies 320 are possible for attachment to the reactive molecule 302. The number of nanotube assemblies 320 and their attachment locations are varied, and the individual physical dimensions of the nanotube assemblies 320 are varied. The electrical properties of the nanotubes could also be varied such as metallic or semiconducting. The variations between individual nanotube assemblies 320, and between combinations of nanotube assemblies 320 associated with each reactive molecule 302 forms a unique signature that is associated with each individual reactive molecule 302. The nanotube assemblies 320 together forms the nanocode 300 identity signature that is later detected to identify the reactive molecule 302 that the signature is associated with. Physical dimensions of the nanotube assemblies 320 that may be varied include length and diameter.

Figure 4:
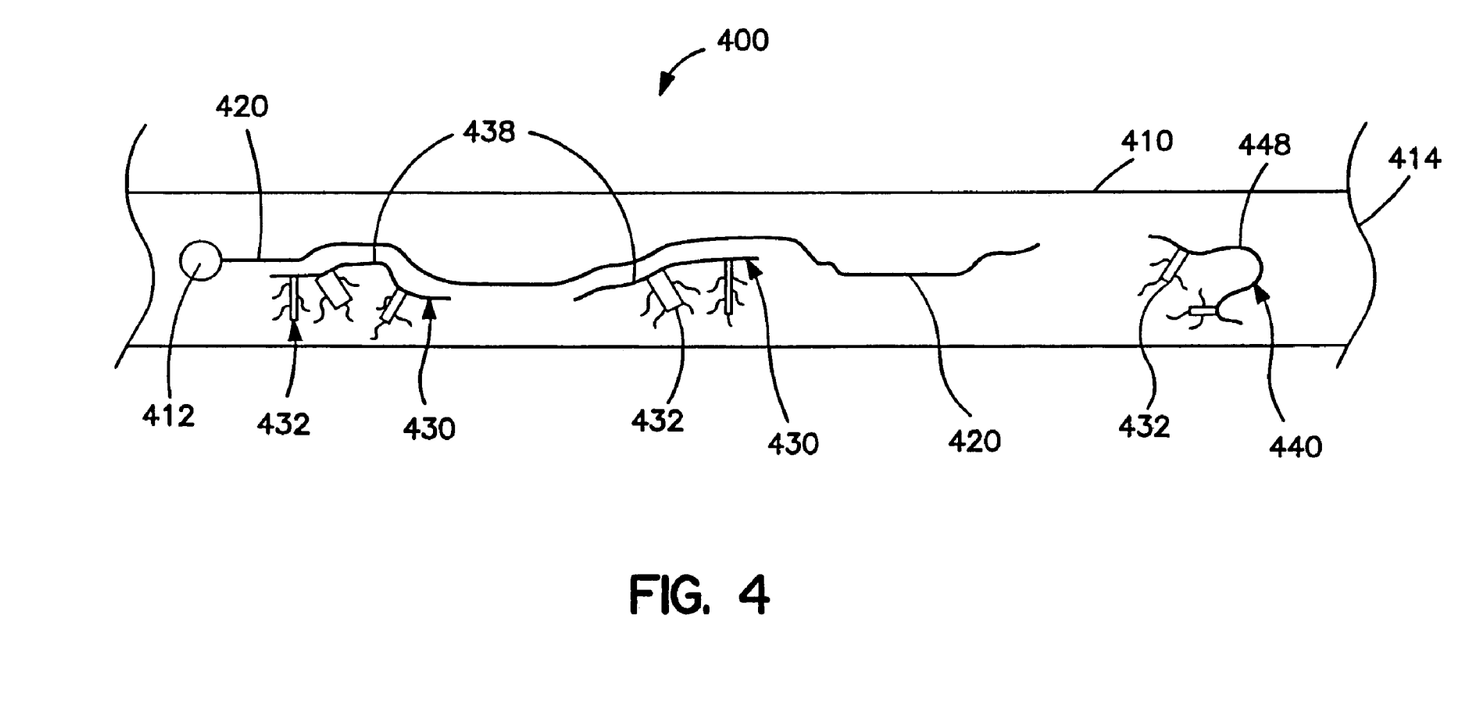
FIG. 4 shows a molecular characterization system in which some of the nanocodes the sample molecule.

FIG. 4 shows a molecular characterization system 400 which includes a reaction chamber 410 with an anchor point 412. A sample molecule 420 to be identified, such as a DNA molecule, is attached at the anchor point 412 in preparation for characterization. A number of nanocodes or molecular identification assemblies 430 are then introduced to the reaction chamber 410 and the sample molecule 420. Each nanocode 430 includes a reactive molecule 438 with a number of carbon nanotube assemblies 432 attached along a length of the reactive molecule 438. The nanocodes 430 are similar to the nanocodes 300 described in FIG. 3. Any number of variations of nanocodes 430 may be introduced into the reaction chamber 410. In one embodiment, such as a DNA sequencing operation, thousands of variations of nanocodes 430 are introduced to the reaction chamber 410.

In the characterization process, certain reactive molecules 438 of their associated nanocodes 430 preferentially associate with, or hybridize with the sample molecule 420. If a known reactive molecule 438 hybridizes at a specific location on the sample molecule 420, an inference can be made about characteristics of the sample molecule 420, such as the specific sequence of that portion of the sample molecule 420.

In the characterization process, other reactive molecules 448 associated with other nanocodes 440 will not preferentially associate with the sample molecule 420. These nanocodes 440 are passed along side the sample molecule 420 and exit the reaction chamber 410 at a chamber outlet 414.

Figure 5:
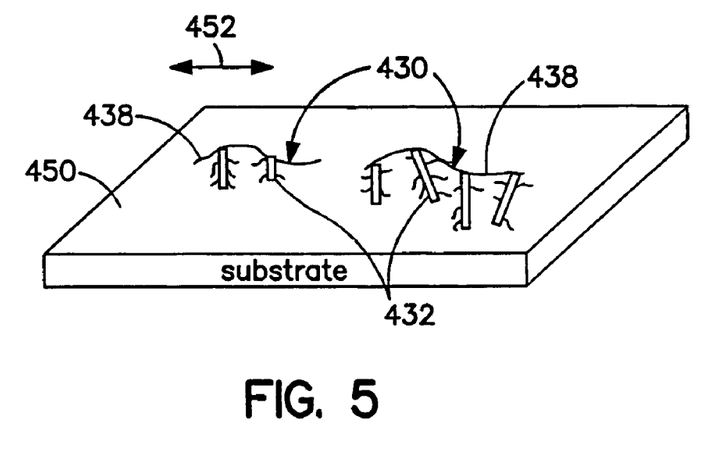
FIG. 5 shows the nanocodes of FIG. 4 placed on a substrate.

After the sample molecule 420 has been introduced to a sufficient number of nanocodes 430, the sample molecule 420 is removed from the reaction chamber 410 and placed on a substrate 450, as shown in FIG. 5. The substrate 450 may include, but is not limited to, a wafer of silicon, mica, or highly ordered pyrolytic graphite (HOPG). One embodiment includes a patterned substrate 450 that preferentially orients the nanocodes 430. The numbers of nanocodes 430 that have preferentially associated with the sample molecule 420 are then removed from the sample molecule 420 through a denaturing step. The ordering of the nanotube assemblies 432 along an axis, such as 452, is preserved in the denaturing step, and each bar code signature of the reactive molecules 438 may be detected.

Figure 6:
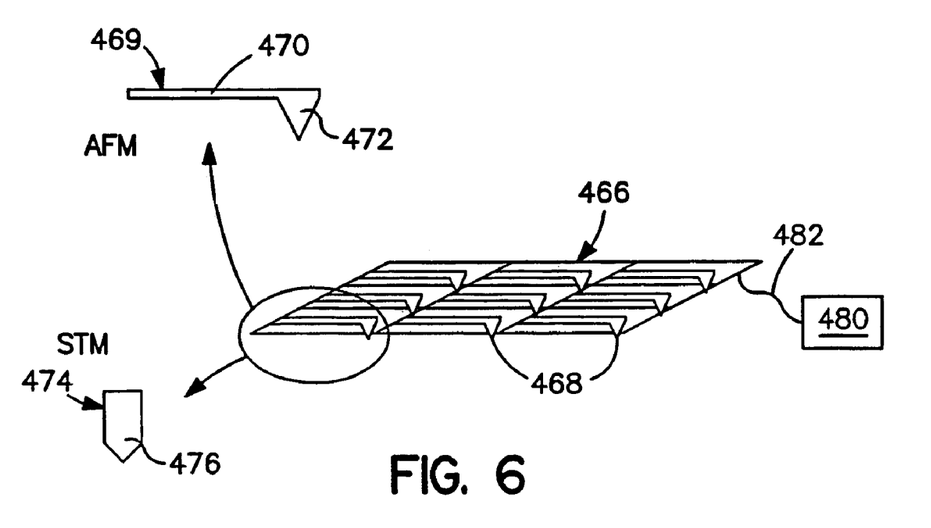
FIG. 6 shows a surface analysis device having a scanning array.
Figure 7:
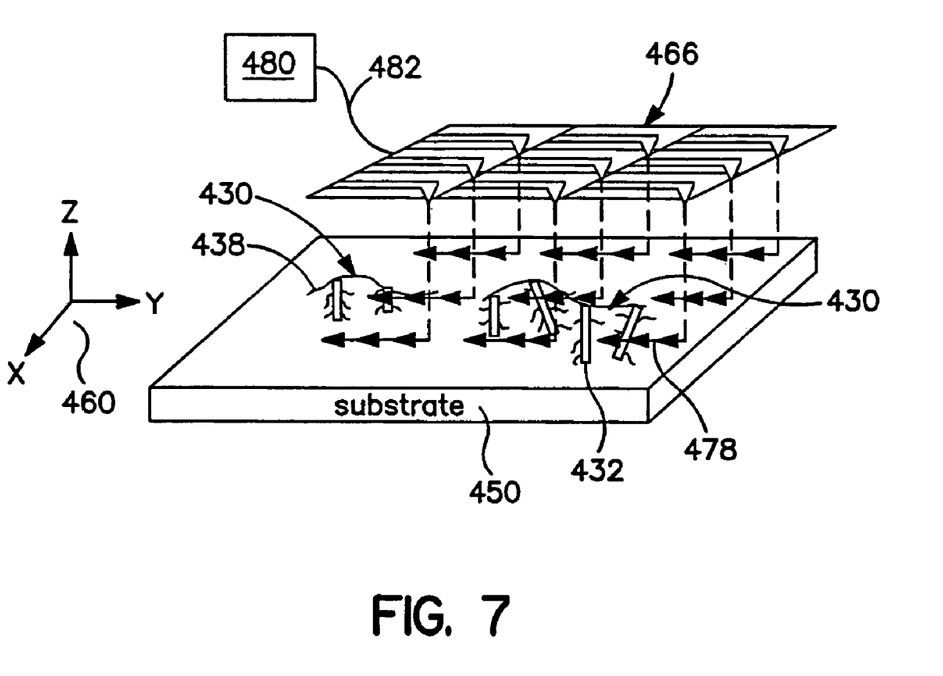
FIG. 7 shows a surface analysis device and a substrate.

A surface analysis device may be used to characterize the surface of a substrate and any particles that are on the surface of the substrate, such as the number of nanotube assemblies. FIG. 6 shows a surface analysis device 466 that is composed of a scanning array of atomic force microscope (AFM) or scanning tunneling microscope (STM) 468 tips. The AFM tip 469 has a cantilever portion 470 with an associated tip 472. The STM tip has a probe 474 with an associated tip 476. In one embodiment, the tips 468 may be a combination of AFM/STM tips. The individual AEM or STM are joined together to form the scanning array 466, which can scan or read a surface simultaneously, as shown in FIG. 7, to get more information in a shorter time. In one embodiment, the simultaneous scanning includes parallel scanning. The scanning array can be virtually any size or configuration, from a small scanning array with two tips, to a large scanning array with hundreds of tips. In the figure, the scanning array is a 3×3 array. The size of the scanning array may be limited to the ability to control each of the AFM/STM tips independently with a feedback loop, and to a lesser extent on fabrication. The scanning array may be attached to an analyzer 480 with appropriate cabling 482. The analyzer 480 has the ability to analyze the simultaneous scanned information from the scanning array and identify the molecule that the scanned information or signature corresponds to.

In FIG. 7, the surface analysis device 466 is lowered to the surface of the substrate 450 and drawn across the surface to detect particles on the surface of the substrate, such as the number of nanotube assemblies 432. The surface analysis device 466 does this with the scanning array simultaneously scanning the surface and identifying the nanocodes 430 that are on the surface of the substrate 450. During the surface analysis of the substrate 450, the AFM tips 472 or STM tips 476 trace out a plurality of scan paths 478 across the surface. As indicated by coordinate axes 460, in one embodiment the scan path includes an x-y scanning plane with scans in the y direction and translations in the x direction. One skilled in the art will recognize that scans in other directions such as the x direction are within the scope of the invention.

Figure 8:
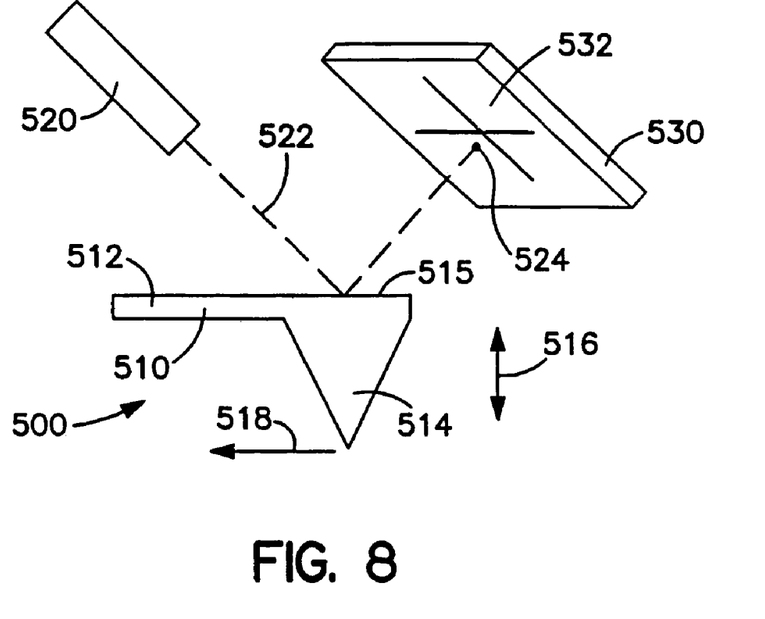
FIG. 8 shows a diagram of the functional component of one atomic force microscope (AFM) of the scanning array in FIG. 6.

FIG. 8 shows a diagram of selected functional components of one atomic force microscope (AFM) 500 used in a AFM scanning array. A cantilever 510 is shown with an arm portion 512 and a tip portion 514. An optical source 520, such as a laser, emits a beam 522 toward a backside 515 of the tip portion 514. The beam reflects off the backside 515 and generates a spot 524 on a detector 530. The detector includes a photosensitive plane 532 that detects a two dimensional location of the spot 524 within the photosensitive plane 532. A force 518 acting on the tip portion 514 of the cantilever 510, such as a friction force, causes the tip portion to deflect upwards or downwards along direction 516. The deflection of the tip portion 514 in turn causes movement of the spot 524, which detects the surface characteristics present on a substrate.

Figure 9:
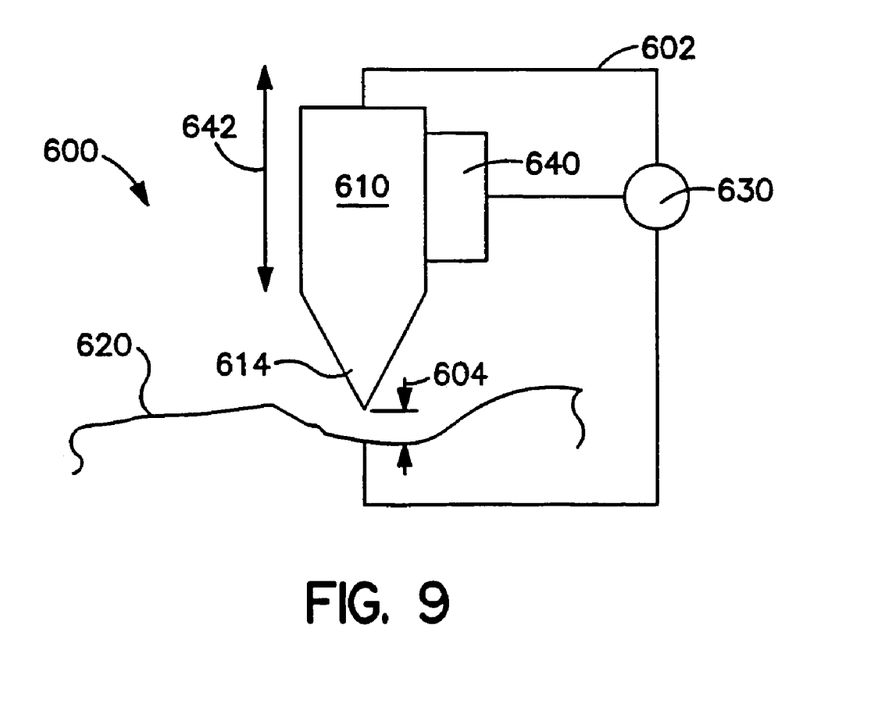
FIG. 9 shows a diagram of the functional component of one scanning tunneling microscope (STM) of the scanning array in FIG. 6.

FIG. 9 shows a diagram of selected functional components of a scanning tunneling microscope (STM) 600 used in a STM scanning array. A probe 610, including a tip portion 614 is electrically coupled to the substrate 620 along circuit 602. An electrical characteristic, such as an electrical potential, is measured between the tip portion 614 and the substrate 620. The electrical characteristic is measured by a detector 630 that provides feedback to a linear actuator 640, such as a piezoelectric device. In one embodiment, a distance 604 between the tip portion 614 and the substrate 620 is monitored and adjusted by a feedback loop. In one embodiment, the actuator 640 is controlled by the detector 630 such that the tip portion 614 maintains a constant distance 604 over the substrate 620 and the movements 642 of the tip portion 614 record surface characteristics along a given scan line. In another embodiment, a constant height of the tip portion 614 is maintained and variation of the electrical characteristics, such as potential, are recorded to provide surface characteristics along a given scan line.

Referring again to FIG. 7, by scanning a substrate 450 with a surface analysis device 466, such as an AFM or STM scanning array, a pattern of nanotube assemblies 432 of the nanocodes 430 is detected. The pattern of the nanocodes 430 indicates a type of a bar code signature of a number of reactive molecules 438 that are associated with the pattern of nanotube assemblies 432. The detected pattern of nanocodes 430 can be related to characteristics of the sample molecule tested, such as a sequence of the sample molecule.

In one embodiment, the modification of the carbon nanotubes to create nanotube assemblies 432, as described above, may alter a friction coefficient at an interface between a first object, such as the carbon nanotube assembly 432, and a second object, such as an AFM tip. Modification of the friction coefficient greatly enhances the detectability of the nanotube assemblies 432 of the nanocodes 430. The friction coefficient can be raised or lowered depending on the type of additional molecules that are attached to the carbon nanotubes 432.

One important factor in detection of the nanotube assemblies is not the friction coefficient itself, but the contrasting friction coefficient between the nanotube assemblies and the surrounding substrate. If the friction coefficient between the AFM tips and the substrate is high, then a low coefficient of friction between the AFM tips and the nanotube assemblies would be desirable to create high contrast. Likewise, if the friction coefficient between the AFM tips and the substrate is low, then a high coefficient of friction between the AFM tips and the nanotube assemblies would be desirable to create high contrast.

In another embodiment, the modification of the carbon nanotubes to create nanotube assemblies 432, as described above, may additionally alter the electrical properties of the carbon nanotube assembly 432. Modification of the electrical properties greatly enhances the detectability of the nanotube assemblies 432, using techniques such as STM. Properties such as conductance can be raised or lowered depending on the type of additional molecules that are attached to the carbon nanotubes. A high electrical contrast between the nanotube assemblies 432 and the surrounding substrate is desirable. If an electrical property is high between the STM tip and the substrate, then that electrical property should be low between the STM tip and the carbon nanotube assemblies. Likewise, if the electrical property between the STM tip and the substrate is low, then a high electrical property between the STM tip and the nanotube assemblies would be desirable to create high contrast.

A novel device and method for characterization of molecules has been shown that improves characterization accuracy by utilizing larger numbers of reactive molecules that are smaller or shorter in chain length for the analysis procedure. Modification of markers, such as nanotubes to form nanotube assemblies, are easily detected using surface analysis devices, such as a scanning array of AFM or STM. The method of using carbon nanotubes to mark a signature on reactive molecules permits the larger distribution and smaller molecule size of reactive molecules used in characterization of a sample molecule. The modification of the carbon nanotubes allows the characterization procedure chosen to detect the nanotube markers more easily, thus decreasing characterization errors, and allowing faster characterization speeds.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A surface analysis device, comprising:
   a substrate having a pattern on a surface of the substrate to orient a plurality of nanocodes, each nanocode comprising a tag element and a reactive molecule;
   a scanning array comprising a plurality of microscopy tips configured to simultaneously scan a plurality of tag elements of the plurality of the nanocodes on the surface of the substrate; and
   an analyzer coupled with the scanning array configured to receive simultaneously scanned information from the scanning array and utilizing the simultaneously scanned information to identify at least a portion of a sample molecule associated with the nanocodes and removed from the substrate prior to the simultaneous scan of the plurality of the tag elements, wherein the sample molecule is different from the plurality of the nanocodes.

2. The device of claim 1, wherein simultaneously scanning includes measuring the friction characteristics of the substrate and the nanocodes.

3. The device of claim 2, wherein the scanning array includes two or more atomic force microscopy (AFM) tips.

4. The device of claim 3, wherein the scanning array is a 3×3 array of AFM tips.

5. The device of claim 1, wherein the molecules include DNA molecules.

6. The device of claim 1, further comprising a substrate holder.

7. The device of claim 1, wherein the nanocodes include molecular assay labels.

8. The surface analysis device of claim 1, wherein the nanocodes include one or more nanotube assemblies having biochemical, organic or inorganic elements.

9. A surface analysis device, comprising:
   a substrate holder having a pattern on a surface of the substrate holder to orient a plurality of nanocodes, each nanocode comprising a tag element and a reactive molecule;
   a scanning array comprising a plurality of microscopy tips proximate the substrate holder configured to move in relation to the substrate holder and simultaneously scan a plurality of tag elements of the plurality of the nanocodes on the surface of the substrate holder; and
   an analyzer coupled with the scanning array configured to simultaneously scanned information from the scanning array and utilizing the simultaneously scanned information to identify at least a portion of a sample molecule associated with the nanocodes and removed from the substrate prior to the simultaneous scan of the plurality of the tag elements, wherein the sample molecule is different from the plurality of the nanocodes.

10. The surface analysis device of claim 9, wherein the nanocodes include one or more nanotube assemblies having biochemical, organic or inorganic elements.

11. A method of simultaneously scanning nanocodes on a surface of a substrate, comprising:
    providing nanocodes on the surface of the substrate, each nanocode comprising a tag element and a reactive molecule; and
    simultaneously scanning the plurality of tag elements of the plurality of the nanocodes using a surface analysis device having a scanning array;
    wherein the nanocodes include one or more nanotube assemblies having biochemical, organic or inorganic elements.

12. The method of claim 11, wherein simultaneously scanning includes measuring the friction characteristics of the substrate and the nanocodes.

13. The method of claim 12, wherein the scanning array includes two or more atomic force microscopy (AFM) tips.

14. The method of claim 13, wherein the scanning array is a 3×3 array of AFM tips.

15. The method of claim 11, wherein the microscopy tips comprises scanning tunneling microscopy (STM) tips.

16. The method of claim 15, wherein the microscopy tips are a combination of atomic force microscopy (AFM) and scanning tunneling microscopy (STM) tips.

17. A method of accelerated scanning of nanocodes on a surface of a substrate of a surface analysis device, comprising:
    orienting a sample molecule and associated nanocodes on the surface of the substrate, the sample molecule being different from the plurality of the nanocodes and each nanocode comprising a tag element and a reactive molecule, to preserve orientation of a plurality of tag elements of the nanocodes;
    removing at least the sample molecule from the surface of the substrate;
    subsequently simultaneously scanning the plurality of tag elements of the plurality of the nanocodes using a scanning array having two or more microscopy tips;
    receiving the simultaneously scanned information from the scanning array with an analyzer; and
    identifying at least a portion the sample molecule associated with the nanocodes.

18. The method of claim 17, wherein the microscopy tips are scanning tunneling microscopy (STM) tips.

19. The method of claim 17, wherein the microscopy tips are atomic force microscopy (AFM) tips.

20. The method of claim 17, wherein the microscopy tips are a combination of atomic force microscopy (AEM) and scanning tunneling microscopy (STM) tips.

21. The method of claim 17, wherein simultaneously scanning includes parallel scanning by the scanning array.

22. The method of claim 17, wherein the nanocodes include one or more nanotube assemblies having biochemical, organic or inorganic elements.

23. A surface analysis device, comprising:
    a substrate having a surface for placing a plurality of nanocodes, each nanocode comprising a tag element and a reactive molecule;
    a scanning array comprising a plurality of microscopy tips configured to simultaneously scan a plurality of tag elements of the plurality of the nanocodes on the surface of the substrate; and an analyzer coupled with the scanning array configured to receive simultaneously scanned information from the scanning array and utilizing the simultaneously scanned information to identify at least a portion of a sample molecule associated with the nanocodes, wherein the microscopy tips comprises scanning tunneling microscopy (STM) tips.

24. The surface analysis device of claim 23, wherein the microscopy tips are a combination of atomic force microscopy (AFM) and scanning tunneling microscopy (STM) tips.

25. A surface analysis device, comprising:

a substrate holder configured to orient a plurality of nanocodes, each nanocode comprising a tag element and a reactive molecule; a scanning array comprising a plurality of microscopy tips proximate the substrate holder configured to move in relation to the substrate holder and simultaneously scan a plurality of tag elements of the plurality of the nanocodes on the surface of the substrate holder; and an analyzer coupled with the scanning array configured to simultaneously scanned information from the scanning array and utilizing the simultaneously scanned information to identify at least a portion of a sample molecule associated with the nanocodes, wherein the microscopy tips comprises scanning tunneling microscopy (STM) tips.

26. The surface analysis device of claim 25, wherein the microscopy tips are a combination of atomic force microscopy (AFM) and scanning tunneling microscopy (STM) tips.

* * * * *

UNITED STATES PATENT AND TRADEMARK OFFICE
CERTIFICATE OF CORRECTION

| | | |
|---|---|---|
| PATENT NO. | : 7,302,832 B2 | Page 1 of 1 |
| APPLICATION NO. | : 10/748526 | |
| DATED | : December 4, 2007 | |
| INVENTOR(S) | : Berlin et al. | |

It is certified that error appears in the above-identified patent and that said Letters Patent is hereby corrected as shown below:

In column 8, line 46, in Claim 17, after "portion" insert -- of --.

In column 8, line 53, in Claim 20, delete "(AEM)" and insert -- (AFM) --, therefor.

Signed and Sealed this

Fifth Day of August, 2008

JON W. DUDAS
*Director of the United States Patent and Trademark Office*